United States Patent
Roma

(10) Patent No.: US 7,356,604 B1
(45) Date of Patent: Apr. 8, 2008

(54) METHOD AND APPARATUS FOR COMPARING SCORES IN A VECTOR SPACE RETRIEVAL PROCESS

(75) Inventor: Norbert Roma, Pittsburgh, PA (US)

(73) Assignee: Claritech Corporation, Pittsburgh, PA (US)

( * ) Notice: Subject to any disclaimer, the term of this patent is extended or adjusted under 35 U.S.C. 154(b) by 0 days.

(21) Appl. No.: 09/551,014

(22) Filed: Apr. 18, 2000

(51) Int. Cl.
*G06F 15/16* (2006.01)
*G06F 17/30* (2006.01)
*G06F 7/00* (2006.01)

(52) U.S. Cl. .................. 709/231; 709/219; 707/3; 707/6

(58) Field of Classification Search ........... 709/231, 709/219; 707/3, 6
See application file for complete search history.

(56) References Cited

U.S. PATENT DOCUMENTS

| | | | | |
|---|---|---|---|---|
| 5,371,673 A | * | 12/1994 | Fan ................... | 704/1 |
| 5,557,227 A | * | 9/1996 | Cook et al. ............ | 327/346 |
| 5,666,490 A | * | 9/1997 | Gillings et al. ........ | 709/238 |
| 5,680,511 A | * | 10/1997 | Baker et al. .......... | 704/257 |
| 5,819,086 A | * | 10/1998 | Kroenke ............... | 707/102 |
| 5,873,076 A | * | 2/1999 | Barr et al. ............. | 707/3 |
| 5,892,909 A | * | 4/1999 | Grasso et al. ......... | 709/201 |
| 6,003,027 A | * | 12/1999 | Prager ................. | 707/5 |
| 6,006,218 A | * | 12/1999 | Breese et al. ......... | 707/3 |
| 6,012,053 A | * | 1/2000 | Pant et al. ............ | 707/3 |
| 6,105,023 A | * | 8/2000 | Callan ................. | 707/5 |
| 6,108,619 A | * | 8/2000 | Carter et al. .......... | 704/9 |
| 6,112,203 A | * | 8/2000 | Bharat et al. ......... | 707/5 |
| 6,119,114 A | * | 9/2000 | Smadja ............... | 707/7 |

(Continued)

FOREIGN PATENT DOCUMENTS

WO    WO 9801807 A1 * 1/1998

(Continued)

OTHER PUBLICATIONS

Albert, R. et al. "Diameter of the World Wide Web," Nature, vol. 401, pp. 130-131, Sep. 9, 1999.*

(Continued)

*Primary Examiner*—Jason D Cardone
*Assistant Examiner*—Melvin H Pollack
(74) *Attorney, Agent, or Firm*—Blaney Harper; Jones Day

(57) ABSTRACT

The delivery ratio of r (which is a fraction between 0 and 1) partitions a stream of documents into a section of top scoring r-fraction of documents and the remainder. This way a set of successively bigger delivery ratios, $r_1, r_2, r_3, \ldots$ sections the stream into tiers. Any given document is assigned to a tier according to how many delivery ratio thresholds it matched or surpassed and how many it failed to reach. This creates a scoring structure which reflects the specificity of the document with respect to a profile in terms of density of relevant documents in the stream. In other words, a document in the $k^{th}$ tier is such that it failed to be classified in the top $r_k$ ratio of the stream (thus $r_k$ fraction of the stream is more relevant to the given profile than the document under consideration). At the same time this document was classified as being in the top $r_{k-1}$ part of the stream. Thus this mechanism defines a score (let's call it σ) for a document depending on how it compares to other documents in the stream when scored against a given profile.

45 Claims, 4 Drawing Sheets

U.S. PATENT DOCUMENTS

| | | | |
|---|---|---|---|
| 6,182,066 B1 * | 1/2001 | Marques | 707/5 |
| 6,182,067 B1 * | 1/2001 | Presnell et al. | 707/5 |
| 6,189,002 B1 * | 2/2001 | Roitblat | 707/1 |
| 6,208,988 B1 * | 3/2001 | Schultz | 707/5 |
| 6,233,575 B1 * | 5/2001 | Agrawal et al. | 707/6 |
| 6,243,713 B1 * | 6/2001 | Nelson et al. | 707/104.1 |
| 6,269,368 B1 * | 7/2001 | Diamond | 707/6 |
| 6,278,990 B1 * | 8/2001 | Horowitz | 707/3 |
| 6,327,574 B1 * | 12/2001 | Kramer et al. | 705/14 |
| 6,327,590 B1 * | 12/2001 | Chidlovskii et al. | 707/5 |
| 6,353,825 B1 * | 3/2002 | Ponte | 707/5 |
| 6,356,864 B1 * | 3/2002 | Foltz et al. | 704/1 |
| 6,377,947 B1 * | 4/2002 | Evans | 707/5 |
| 6,385,619 B1 * | 5/2002 | Eichstaedt et al. | 707/104.1 |
| 6,405,199 B1 * | 6/2002 | Carter et al. | 707/6 |
| 6,430,559 B1 * | 8/2002 | Zhai | 707/5 |
| 6,446,066 B1 * | 9/2002 | Horowitz | 707/5 |
| 6,473,755 B2 * | 10/2002 | Evans | 707/5 |
| 6,498,921 B1 * | 12/2002 | Ho et al. | 434/362 |
| 6,507,839 B1 * | 1/2003 | Ponte | 707/3 |
| 6,513,036 B2 * | 1/2003 | Fruensgaard et al. | 707/4 |
| 6,529,895 B2 * | 3/2003 | Heckerman | 707/2 |
| 6,546,383 B1 * | 4/2003 | Ogawa | 707/2 |
| 6,557,043 B1 * | 4/2003 | Fletcher | 709/231 |
| 6,578,025 B1 * | 6/2003 | Pollack et al. | 707/2 |
| 6,587,850 B2 * | 7/2003 | Zhai | 707/5 |
| 6,601,026 B2 * | 7/2003 | Appelt et al. | 704/9 |
| 6,632,251 B1 * | 10/2003 | Rutten et al. | 715/530 |
| 6,901,399 B1 * | 5/2005 | Corston et al. | 707/6 |
| 6,922,699 B2 * | 7/2005 | Schuetze et al. | 707/103 R |
| 2001/0049727 A1 * | 12/2001 | Mukherjee et al. | 709/219 |
| 2001/0056419 A1 * | 12/2001 | Lee | 707/6 |
| 2002/0002450 A1 * | 1/2002 | Nunberg et al. | 704/1 |
| 2002/0040403 A1 * | 4/2002 | Goldhor et al. | 709/231 |
| 2002/0165851 A1 * | 11/2002 | Fernandes et al. | 707/3 |

FOREIGN PATENT DOCUMENTS

WO      WO 9910819 A1 *   3/1999

OTHER PUBLICATIONS

Broder, Andrei et al. "Graph Structure in the Web," 9th Intl. WWW Conference, 2000.*

Barabasi, Albert-Laszlo et al. "Scale-free Characterstics of Random Networks: the Topology of the World-Wide Web," Elsevier Science B.V., 2000.*

Cetintemel, Ugur et al. "Self-Adaptive User Profiles for Large-Scale Data Delivery," 16th Intl. Confernce on Data Engineering, Mar. 3, 2000, pp. 622-633.*

Mani, Inderjeet and Bloedorn, Eric. "Summarizing Similarities and Differences Among Related Documents," Information Retrieval, vol. 1, Nos. 1-2, Apr. 1999, pp. 35-67.*

Equitz, William H. "A New Vector Quantization Clustering Algorithm," IEEE Transactions on Acoustics, Speech, and Signal Processing, vol. 37, No. 10, Oct. 1989, pp. 1568-1575.*

Ding, Chris H.Q. "A Probabilistic Model for Dimensionality Reduction in Informatin Retrieval and Filtering," Jan. 2001.*

* cited by examiner

METHOD AND APPARATUS FOR COMPARING SCORES IN A VECTOR SPACE RETRIEVAL PROCESS

FIELD OF THE INVENTION

The present invention relates to the field of computerized search and retrieval systems. More particularly, this invention relates to a method and apparatus for retrieving information wherein a vector space search algorithm is used to retrieve information concerning multiple vector profiles.

BACKGROUND OF THE INVENTION

Advances in electronic storage technology has resulted in the creation of vast databases of documents stored in electronic form. These databases can be accessed from remote locations around the world. As a result, vast amounts of information are available to a wide variety of individuals. Moreover, information is not only stored in electronic form, but it is created in electronic form and disseminated throughout the world. Sources for the electronic creation of such information includes news, periodicals, as well as radio, television and Internet services. All of this information is also made available to the world through computer networks, such as the worldwide web, on a real time basis. The problem with this proliferation of electronic information, however, is how any one individual may access information useful to that individual in a timely manner. In particular, how any one individual can receive individual pieces of information on a real time basis (e.g., a stream of documents) and decide which pieces of information are useful to the user.

Specifically, there are many search techniques to retrieve information from a database or data stream such as Boolean word searches, typed information retrieval or vector space based retrieval algorithms. Vector space based algorithms calculate a number that represents the similarity between any document in a database and a vector profile having a series of terms or phrases. Vector space based algorithms, while general and sophisticated, have several shortcomings. One of them is the fact that numeric vector space scores of documents against two different profiles, in general, are not directly comparable to each other. This is unsatisfactory for several reasons. First, from the point of view of an end-user, it might be desirable to inspect scores for a certain document in contexts of several profiles. This could be done, for example, in order to evaluate the performance of the profiles in question so that they can be adjusted to improve their accuracy. Another use for comparable, or normalized, scores across profiles is to facilitate a multiple classification procedure. One way to implement a multiple classifier is by employing a score threshold for tags (classes, profiles). For this to be meaningful, the scores for different tags have to be comparable to each other.

OBJECTS OF THE INVENTION

It is an object of the present invention to provide an improved method and apparatus for retrieving information from a data source such as a data stream.

It is another object of the present invention to retrieve information by comparing scores of multiple vector profiles.

It is still a further object of the present invention to make use of the score distribution of different profiles to compare scores.

SUMMARY OF THE INVENTION

In general, normalizing scores relies on the existence of a natural normalization reference in form of a reference collection. For example, an organization interested in classifying news would be able to collect an archive of, for example, a week's worth of news articles. This is a natural resource with general properties of the news stream that can be used to normalize the scores of profiles classifying this stream. One possible way to draw on this resource is to use a delivery ratio mechanism to establish a set of, for example, nine (vector space) score thresholds (let's call them $x_k$, k=1, 2, . . . , 9) for each profile. Now, each new article in the stream can be assigned to one of the ten levels delimited by those thresholds. These levels can be treated as a discrete, ten-point score for the document. Clearly the score is comparable across profiles.

The delivery ratio of r (which is a fraction between 0 and 1) partitions a stream (or a static set—these two kinds of document sources are interchangeable) of documents into a section of top scoring r-fraction of documents and the remainder. This way a set of successively bigger delivery ratios, $r_1, r_2, r_3, \ldots$ sections the stream into tiers. Any given document is assigned to a tier according to how many delivery ratio thresholds it matched or surpassed and how many it failed to reach. This creates a scoring structure which reflects the specificity of the document with respect to a profile in terms of density of relevant documents in the stream. In other words, a document in the $k^{th}$ tier is such that it failed to be classified in the top $r_k$ ratio of the stream (thus $r_k$ fraction of the stream is more relevant to the given profile than the document under consideration). At the same time this document was classified as being in the top $r_{k-1}$ part of the stream. Thus, this mechanism defines a score (referred to as σ) for a document depending on how it compares to other documents in the stream when scored against a given profile.

DESCRIPTION OF THE PREFERRED EMBODIMENTS

Figure 1:
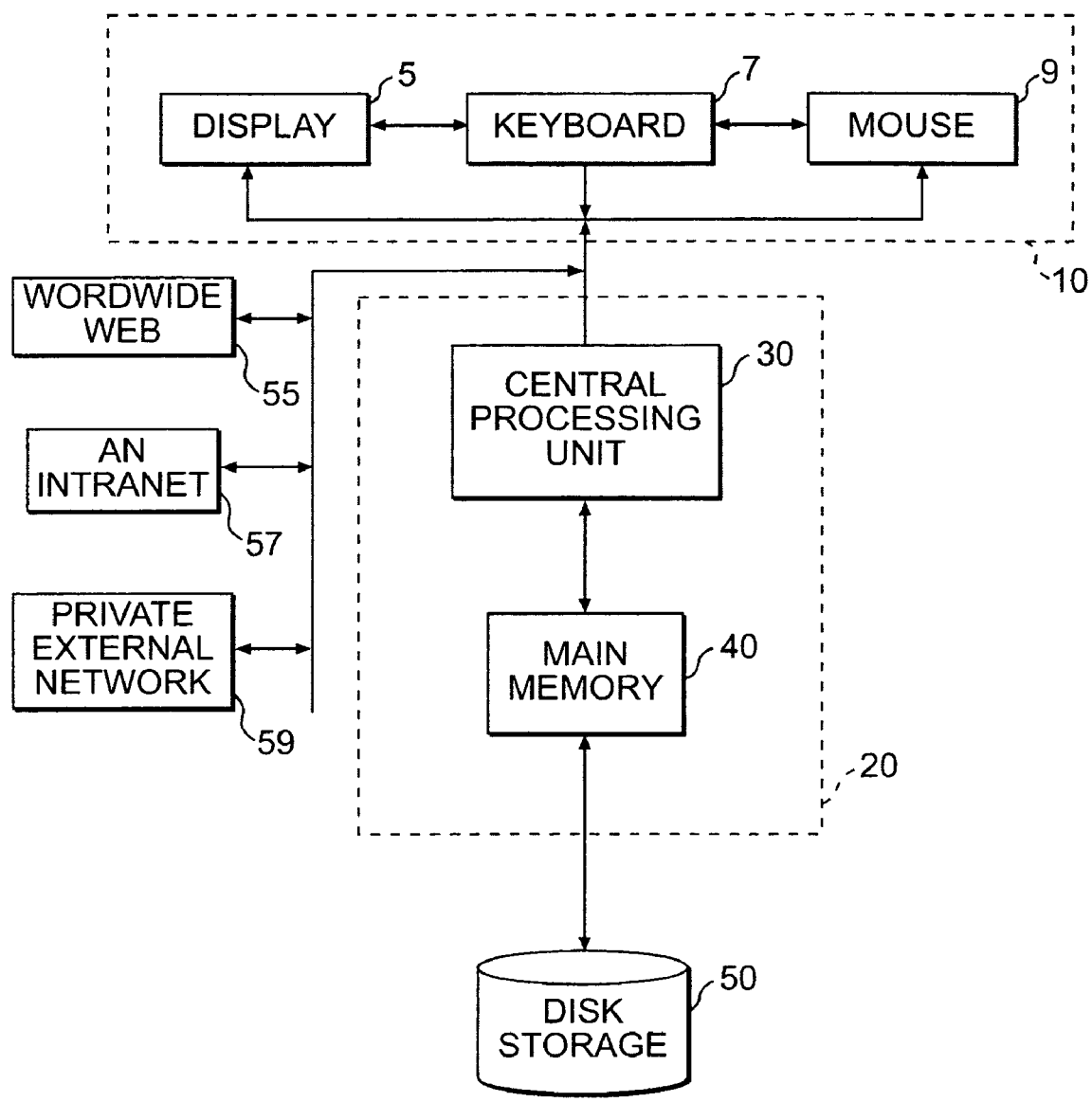
FIG. 1 is a block diagram that illustrates a computer system for performing information extraction according to one embodiment of the present invention.

FIG. 1 is a block diagram of a computer system used for retrieving information from a database. Computer 20 comprises a central processing unit (CPU) 30 and main memory 40. Computer 20 is connected to an Input/Output (I/O) system 10 and disk storage unit 50. The I/O system 10 includes a display 5, a keyboard 7 and a mouse 9. Furthermore, this computer system is connected to a variety of networks for communicating with other computers and obtaining access to remote databases. Among the networks connected to this computer system is the worldwide web 55, an intranet 57, private external network 59. In general, the disk storage unit 50 stores the program for operating the computer system and it stores the documents of the database. The computer 20 interacts with the I/O system 10 and the disk storage unit 50. The computer 20 executes operations according to instructions contained in a program that is retrieved from the disk storage unit 50. This program causes the computer 20 to retrieve the text of documents, or parts thereof, which are stored in a database located either in disk storage 50 or in a storage location accessible over a network. These instructions also cause information received over a network to be distributed to specific individuals over a network based on the content of the information.

According to the present invention, the program that performs the information extraction incorporates instructions that compare scores from a source document against scores obtained from reference data. To consider the problem of score comparison, the characteristics of the source data—either a static corpus (but only as a stream-like source of documents, in other words we do not assume the ability to do retrieval on the document source), or a live document stream are known. Additionally, a reference corpus with term-statistics compatible with that of the document source exists. To define the normalized score, the following series of steps is performed.

1. The first parameter necessary to build the score is the number of thresholds used, denoted n. This count of thresholds includes all the (non-trivial) thresholds r∈(0, 1). Thus, if $r_0 \equiv 0$, the set of all thresholds in the score is indexed: $r_k$ where k=0, 1, ..., n. In addition, imposing $r_{n+1}=1$ ensures that the highest tier's size is consistent with others. (Step 410 of FIG. 4.)
2. Choose a mapping r:{1, 2, ..., n}→(0, 1) from the set of indices, as discussed below, to set all possible delivery-ration thresholds. (Step 420.)
3. In the next step we need to run a set of trained profiles against the reference corpus. This run produces (via the delivery ratio mechanism used for each $r_k$ for each profile) a set of vector space scores, $x_k$, k=1, 2, ..., n corresponding to the thresholds for each profile in turn. (Step 430.)
4. Now, we are ready to score documents from the document source: Given an incoming document, we obtain a vector space score, x, of that document against a given profile, and we compare it to all the thresholds $x_k$. Let l=1, 2, ..., n−1 be such that $x_l \leq x < x_{l+1}$, then we assign a score σ=1 to that document. For documents with $x < x_l$ we set the score σ=0, and in case of $x \geq x_n$ the score is σ=n. This is the normalized score of the document against the given profile. Of course, the actual numerical value of σ can be defined in any number of ways, but the choice presented here is simple, and easy to interpret. (Step 440.)

Figure 4:
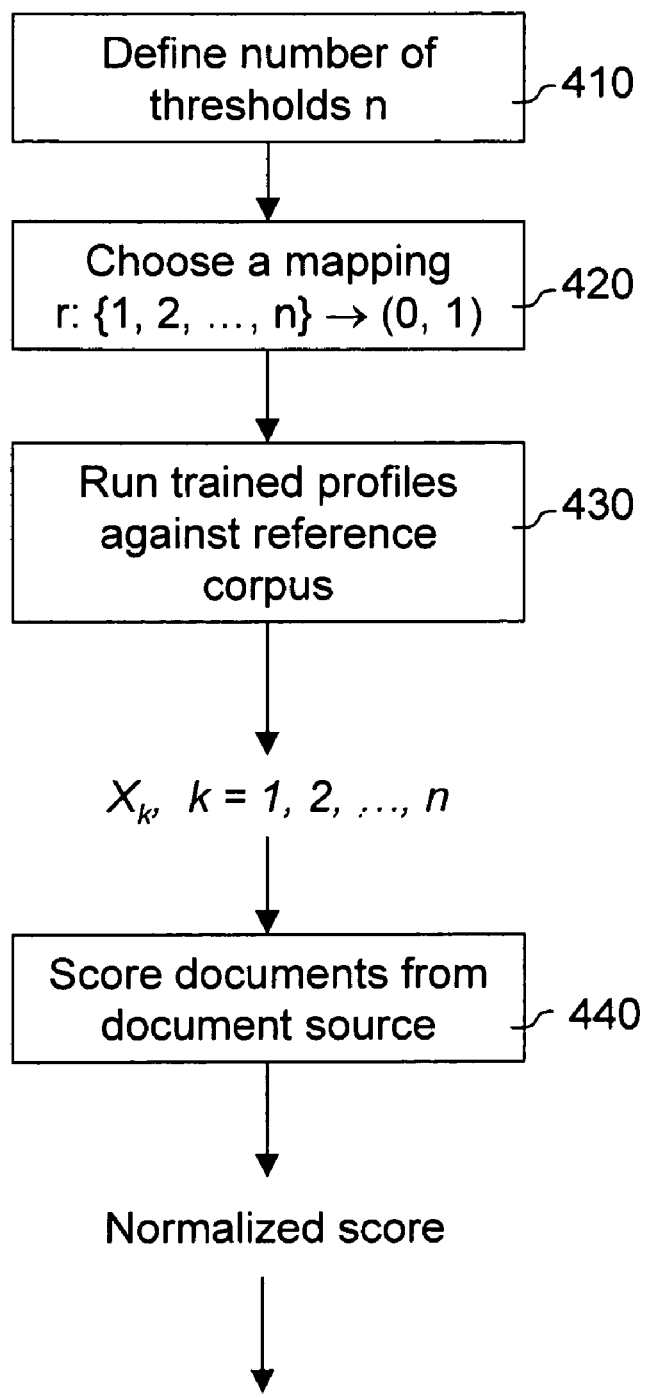
FIG. 4 is a flow diagram illustrating a method for defining a normalized score according to another embodiment.

A flow diagram illustrating this method for defining a normalized score is shown in FIG. 4.

Figure 2:
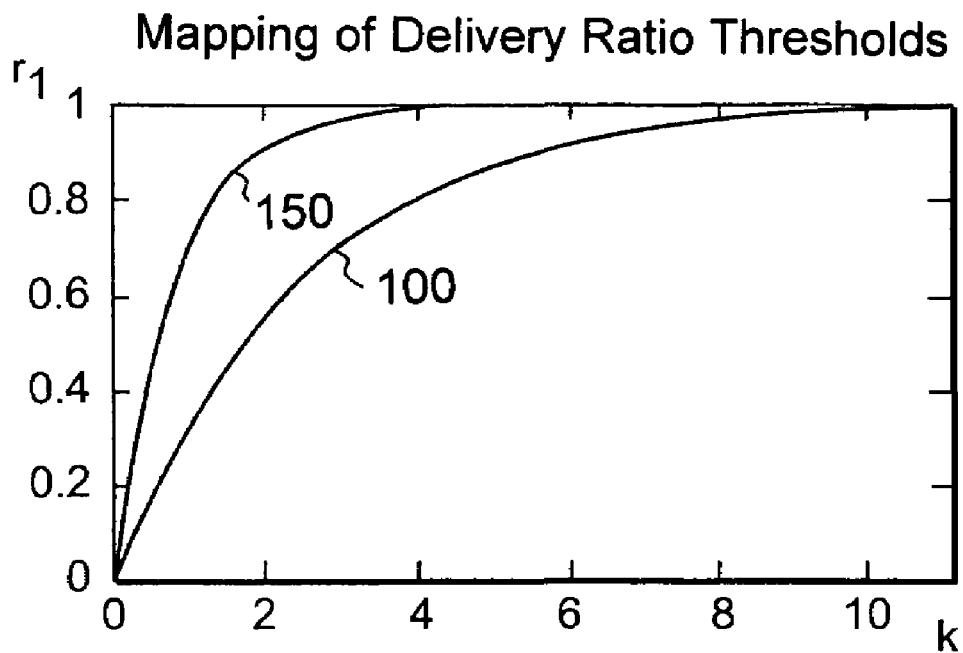
FIG. 2 illustrates the scaling of delivery ratio maps according to one embodiment of the present invention.

Furthermore, certain mappings are defined. The mapping used to set delivery ratio thresholds is defined as follows:

$$r_k = \frac{1 - a^{-k}}{1 - a^{-(n+1)}}$$

and is parameterized by the base a∈(1, ∞), of the exponent. This parameterization allows for relative scaling of maps. FIG. 2 demonstrates the scaling of maps corresponding to a=1.5 (100) and a=4 (150) where n=10.

Figure 3:
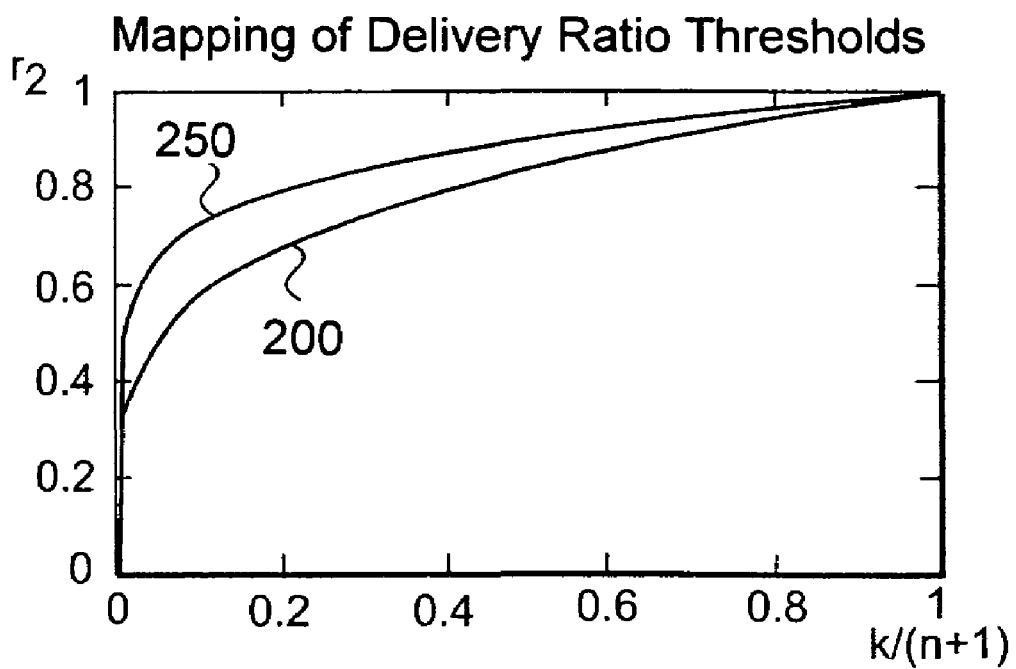
FIG. 3 illustrates the scaling of delivery ratio maps according to another embodiment of the present invention.

The power law mapping also uses one free parameter, s (which is used for relative scaling) and is defined as follows:

$$r_k = \left(\frac{k}{n+1}\right)^{\frac{1}{s}},$$

where s∈(1, ∞). This formula normally gives practical mappings for s>4, and is characterized by the fact that it is close to linear at the top of the scale (for the high-scoring documents). FIG. 3 illustrates the power law character of the curve on two examples wherein S=4 (200) and S=7 (250). The nearly linear behavior of the scale at the high end of the scores may not be the best way to space the thresholds from the point of view of direct user judgment, but may be very useful in automatic systems.

It is clear from the definitions of the maps above that one could extend the normalized score from a discrete set of values to a continuous scale. This is accomplished in several ways:

1. The exponential scale above can be redefined, using another integer parameter m>n, such that now k=0, 1, ..., m and $$r_k = \frac{1 - a^{-\frac{k(n+1)}{m}}}{1 - a^{-(n+1)}}$$

This gives us the old mapping for m=n+1, but gives us a continuous scale in the limit of m→∞, so it can be approximated through using large m.

2. In case of the power law, simply taking n→∞ produces a continuous scale.
3. The above two methods call for calculation of a large number of thresholds for each scale, which is computationally undesirable. It may be more practical to use a discrete scale and linearly interpolate between the discrete scores to obtain an approximate continuous scale. Specifically, if we choose to associate a score σ(k)=k (as defined above,) with each $x_k$ (for k=0, 1, ..., n), then we can define the interpolated σ(x) for $x_k \leq x \leq x_{k+1}$ as follows:

$$\sigma(x) = \frac{x - x_k}{x_{k+1} - x_k}(\sigma(k+1) - \sigma(k)) + \sigma(k).$$

This defines a continuous scale of scores σ between σ=0 corresponding to $x_0$=0, and $\sigma_{n+1}$=n+1 corresponding to $x_{n+1}$. The definition of $x_{n+1}$ is the highest possible score of a document against the given profile. This is a well defined number for most vector space scoring algorithms.

Finally, there is the subject of selection of the scaling parameters present in the mappings introduced above. (a and s for exponential and power law maps respectively.) The easiest case is when we have relevance judgments available for a sizable random sample of the reference collection. In this scenario we can simply adjust the specificity of a set of profiles by looking at the total numbers of documents relevant to each profile in the sample. The ratios of those totals would determine the appropriate ratios of scaling parameters for those profiles. (Specifically, the ratio of totals could be set equal to a ratio of two $r_k$'s for two different profiles at some fixed k, corresponding to some fixed σ=k.)

This new normalization method may be used for filtering applications, and it can be easily adapted to scoring interest representations against any document source. For example, a company may have a set of (say, 100) different tags that it would like to assign to articles in the incoming news stream. It is reasonable to assume that such a company would be able to collect an archive of, say, a month's worth of news.

Furthermore, it is reasonable to expect that the general characteristics of the news stream change slowly enough, that the sample would continue to be a valid representation of the term usage in the news stream for many months.

With the corpus of archived articles ready, it is possible now to create a score scale for each profile according to the method described above. This allows for immediate application of the delivery ratio method for thresholding, as well as any other thresholding mechanism that relies on the newly produced scores. Moreover, the scores for any given news item are comparable across all profiles, which makes it possible to set threshold performance for tags. Thus a variable number of (rank-ordered) tags can be assigned to any given news story, depending on how many profiles score above the threshold. This technique of assigning a well controlled number of multiple tags to a document is usually called multiple classification.

This threshold, of course, may be tag-dependent, which, for example in the case of the delivery ratio thresholding, could be a reflection of different specificity of various tags. To illustrate this let me consider three example tags: "sports", "ice hockey", and "NASA". In a general news stream, we could reasonably expect that around 10% of the news stories would have to do with sports to a degree that would warrant assigning the tag "sports" to them. On the other hand, it is equally reasonable to think that no more than, say, 1% of the news stories were sufficiently relevant to the subject of ice hockey to justify assigning the corresponding tag. This tighter threshold for "ice hockey" reflects the fact that it is a subset of sports, and so it is more specific (or focused). Of course, two profiles do not need to include one another to differ in the level of specificity: As before, no more than 1% of the stories in the general news stream are likely to need the tag "NASA", but this time the reason for the low number is not that the subject is a subset of "sports", but solely because the definition of the interest is more limited.

While assigning individual thresholds to tags does help solve the issue of tag specificity, a more flexible way of addressing this problem can be found through scaling the whole score scale for a tag. For example, instead of using different thresholds for "sports" and "ice hockey" tags, we could use one score threshold, θ, and calibrate the scores for both tags so that θ corresponded to a 10% point for "sports" and to 1% for "ice hockey".

First, the number of score points must be determined. A scale with ten distinct scores, referred to as σ=0, 1, 2, ..., 9 is used. As a result, setting θ to the σ score of 3, provides flexibility so that there are three score levels among the rejected articles (those scoring 0—completely irrelevant, 1—remotely related, or 2—"near misses"), and a (partially) ranked list of relevant news items. For the tag "sports", this means that the third (since θ=3) threshold in the score scale $r_3$=0.9, because the top 10% of the news stream are treated as relevant to the tag. Based on that requirement, the base of the exponent is determined and then the other eight thresholds in the score are computed. Carrying out the computations produces the following sequence of delivery ratio thresholds, each of which corresponds to respective a scores:

| σ    | 0 | 0.5354 | 0.7843 | 0.9000 | 0.9538 | 0.9790 | 0.9904 | 0.9958 | 0.9983 | 0.9995 |
|------|---|--------|--------|--------|--------|--------|--------|--------|--------|--------|
| $r_k$ | 0 | 1      | 2      | 3      | 4      | 5      | 6      | 7      | 8      | 9      |

Now, we can run the profile for "sports" in retrieval mode against the reference corpus and, using the delivery ratio algorithm, find the raw vector space scores, $x_k$, corresponding to all the $r_k$ thresholds. This way, once we start scoring incoming news stories, we will be able to assign a σ score to each one of them based on its vector space score, and the number of thresholds in the normalized scale that it passed. This is the complete recipe for generating normalized score for news stories about sports events. To complete the example with an illustration of relative scaling, let's go back to the "ice hockey" tag.

We can treat the tag "ice hockey" much the way we dealt with "sports", with the difference being that now we impose $r_3$=0.99, since only 1% of the news stream is expected to be relevant to the topic. This, again, results in a sequence of delivery ratio thresholds, which are then used to assign the σ score to each news article. (As before, we need to run the profile in retrieval mode against the reference database to obtain the vector space scores, $x'_k$, for each of the thresholds $r_k'$ for "ice hockey".) The following table demonstrates how a uniform score, σ, is associated with different sets of thresholds for the two profiles we are considering:

| σ | sports $r_k$ | ice hockey $r'_k$ |
|---|--------------|-------------------|
| 0 | 0            | 0                 |
| 1 | 0.5354       | 0.784555          |
| 2 | 0.7843       | 0.953584          |
| 3 | 0.9000       | 0.990000          |
| 4 | 0.9538       | 0.997846          |
| 5 | 0.9790       | 0.999536          |
| 6 | 0.9904       | 0.999900          |
| 7 | 0.9958       | 0.999979          |
| 8 | 0.9983       | 0.999996          |
| 9 | 0.9995       | 0.999999          |

The above example demonstrates the following steps in the procedure for deriving a normalized score for a collection of profiles, using a reference database:

1. Choose the number of uniform score levels to appropriately reflect the distribution of relevance over the source stream. (Set n.) (Step 510 of FIG. 5.)
2. Decide on which mapping (for example, chose one of the two such mappings discussed above) is more appropriate for the given application. (Step 520.)
3. Select the threshold of relevance on the new scale for each tag. (Set θ=3. Optionally impose $r_3$=0.9; Instead of setting one of the $r_k$'s to a given ratio, one could just fix the base of the exponent, which would in turn determine $r_3$.) (Step 530.)

4. Run the profile for the tag in retrieval mode against the reference collection in order to get the raw vector space scores for the delivery ratio thresholds comprising the score scale. (Step 540.)
5. For each new story, we can now determine its vector space score (step 550), compare it to the delivery ratio scores in the normalized score scale (step 560), and, depending on how many of those thresholds it passes, we can assign it a normalized (σ) score (step 570), and compare it to θ (step 580). This last comparison determines whether the news story receives the tag or not (step 590).
6. As an extra bonus, we end up with a rank-ordered list of tags. This can be used to limit the number of tags to a certain maximum (even if more tags manage to pass the threshold of θ) of most relevant tags. It can also be used to assign several highest scoring tags to documents that did not score above θ for any tags, as long as some tags scored above 0.

Figure 5:
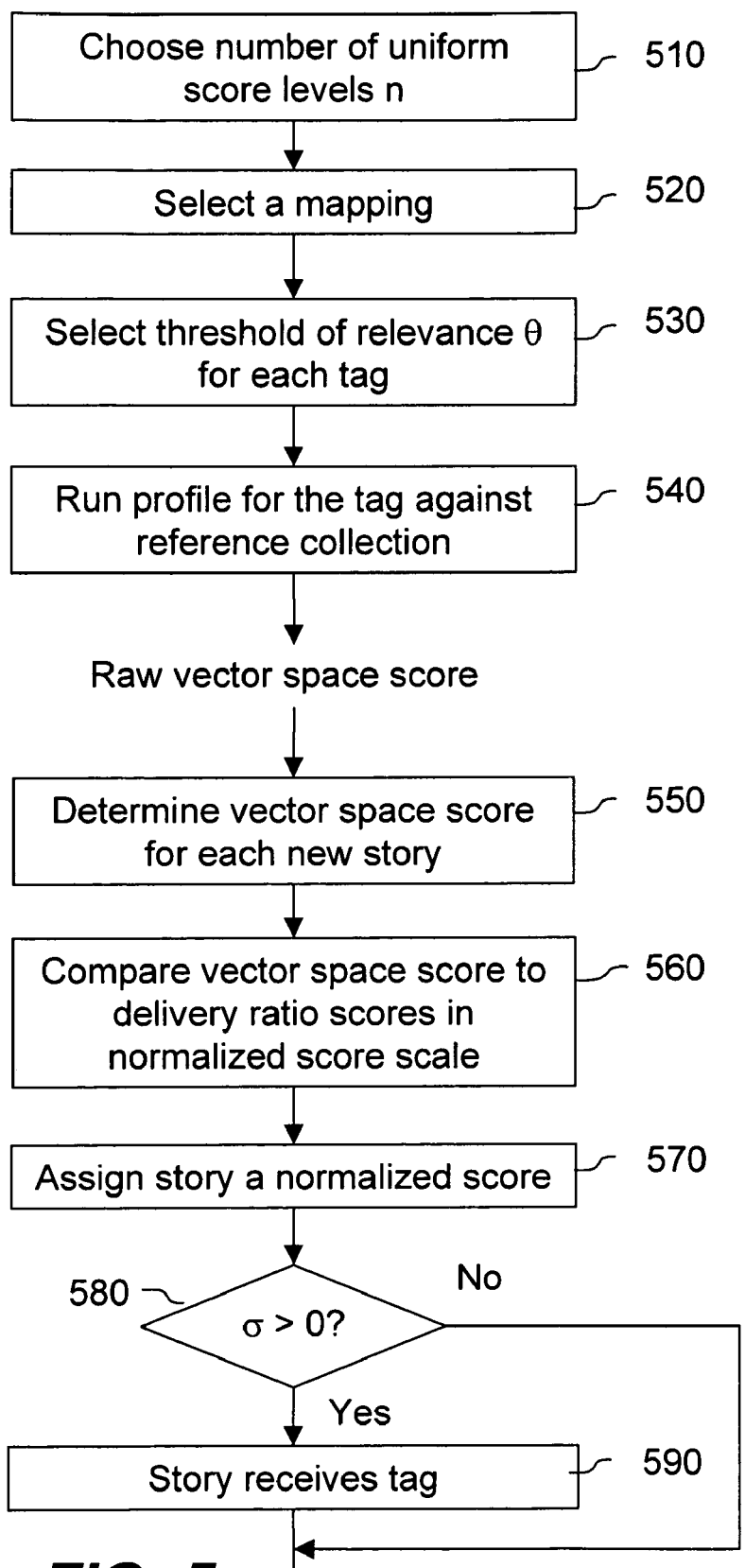
FIG. 5 is a flow diagram illustrating a procedure for deriving a normalized score for a collection of profiles according to another embodiment.

A flow diagram illustrating this procedure for deriving a normalized score for a collection of profiles is shown in FIG. 5.

I claim:

1. A method for analyzing documents from a data source, comprising:
    analyzing a reference corpus using a profile to determine reference corpus document scores indicative of content of documents in the reference corpus relative to the profile;
    identifying a particular reference corpus document score that corresponds to a particular delivery ratio of documents of the reference corpus based on the analysis of the reference corpus;
    assigning threshold scores to a multiplicity N of score threshold levels such that the particular reference corpus document score is assigned to be a threshold score for a given one of the N score threshold levels;
    analyzing a data source using the profile and determining raw document scores for documents from the data source relative to the profile based upon the analysis of the data source;
    comparing the raw document scores to the threshold scores of the N score threshold levels;
    assigning normalized document scores to documents of the data source based on the comparison of the raw document scores to the threshold scores of the N score threshold levels as indicators of document relevancy to the profile; and
    selecting a document based upon its normalized document score.

2. The method of claim 1, comprising assigning a tag to the document if the normalized document score of the document satisfies a relevance threshold, the tag being descriptive of content associated with the profile.

3. The method of claim 1, wherein the N score threshold levels correspond to N delivery ratios according to an exponential scaling function.

4. The method of claim 3, wherein the exponential scaling function is given by:

$$r_k = \frac{1 - a^{-k}}{1 - a^{-(n+1)}}$$

wherein k is an index for the score threshold levels and corresponds to an integer $\epsilon(0, n)$, n corresponds to an integer$\geq 1$, a$\epsilon(1, \infty)$, and $r_k$ corresponds to a delivery ratio.

5. The method of claim 1, wherein the N score threshold levels correspond to N delivery ratios according to a power law function.

6. The method of claim 5, wherein the power law function is given by: $r_k=(k/(n+1))^{(1/s)}$ wherein k is an index for the score threshold levels, n corresponds to an integer$\geq 1$ and s$\epsilon(1, \infty)$.

7. The method of claim 1, wherein the data source comprises a data stream.

8. A method for analyzing documents from a data source, comprising:
    analyzing a reference corpus using a first profile and a second profile to determine reference corpus document scores indicative of content of documents in the reference corpus relative to the first and second profiles;
    identifying a first reference corpus document score that corresponds to a first delivery ratio of documents of the reference corpus based on the analysis of the reference corpus using the first profile;
    identifying a second reference corpus document score that corresponds to a second delivery ratio of documents of the reference corpus based on the analysis of the reference corpus using the second profile;
    for the first profile, assigning first threshold scores to a multiplicity N of score threshold levels such that the first reference corpus document score is assigned to be a threshold score for a given one of the N score threshold levels;
    for the second profile, assigning second threshold scores to the N score threshold levels such that the second reference corpus document score is assigned to be a threshold score for the given one of the N score threshold levels;
    analyzing a data source using the first and second profiles and determining first and second raw document scores for documents from the data source relative to the first and second profiles, respectively, based upon the analysis of the data source;
    comparing the first and second raw document scores generated from the analyses of the data source to the respective first and second threshold scores of the N score threshold levels;
    assigning first normalized document scores to documents of the data source based on the comparison of the first raw document scores to the first threshold scores of the N score threshold levels as indicators of document relevancy to the first profile;
    assigning second normalized document scores to the documents of the data source based on the comparison of the second raw document scores to the second threshold scores of the N score threshold levels as indicators of document relevancy to the second profile; and
    classifying a given document of the data source as being relevant to at least one of the first profile and the second profile if at least one of the first normalized document score and the second normalized document score of the given document, respectively, satisfy a relevance threshold.

9. The method of claim 8, comprising selecting the given document for transmission over a communications network.

10. The method of claim 8, wherein the N score threshold levels correspond to N delivery ratios according to an exponential scaling function.

11. The method of claim 10, wherein the exponential scaling function is given by:

$$r_k = \frac{1-a^{-k}}{1-a^{-(n+1)}}$$

wherein k is an index for the score threshold levels and corresponds to an integer $\epsilon(0, n)$, n corresponds to an integer$\geq 1$, $a\epsilon(1, \infty)$, and $r_k$ corresponds to a delivery ratio.

12. The method of claim 8, wherein the N score threshold levels correspond to N delivery ratios according to a power law function.

13. The method of claim 12, wherein the power law function is given by:
$r_k = (k/(n+1))^{(1/s)}$ wherein k is an index for the score threshold levels, n corresponds to an integer$\geq 1$ and $s\epsilon(1, \infty)$.

14. The method of claim 8, comprising:
assigning a first tag to the given document if the first normalized score satisfies a first relevance threshold and assigning a second tag to the given document if the second normalized score satisfies a second relevance threshold; and
ranking the first and second tags according to relevance to the given document based upon the first normalized score and the second normalized score, the first and second tags being descriptive of content of the first and second profiles, respectively.

15. The method of claim 8, wherein the data source comprises a data stream.

16. A system for analyzing documents from a data source, comprising:
a memory; and
a processing system coupled to the memory,
wherein the processing system is configured to:
analyze a reference corpus using a profile to determine reference corpus document scores indicative of content of documents in the reference corpus relative to the profile;
identify a particular reference corpus document score that corresponds to a particular delivery ratio of documents of the reference corpus based on the analysis of the reference corpus;
assign threshold scores to a multiplicity N of score threshold levels such that the particular reference corpus document score is assigned to be a threshold score for a given one of the N score threshold levels;
analyze a data source using the profile and determine raw document scores for documents from the data source relative to the profile based upon the analysis of the data source;
compare the raw document scores to the threshold scores of the N score threshold levels;
assign normalized document scores to documents of the data source based on the comparison of the raw document scores to the threshold scores of the N score threshold levels as indicators of document relevancy to the profile; and
select a document based upon its normalized document score.

17. The system of claim 16, the processing system being configured to assign a tag to the document if the normalized document score of the document satisfies a relevance threshold, the tag being descriptive of content associated with the profile.

18. The system of claim 16, wherein the N score threshold levels correspond to N delivery ratios according to an exponential scaling function.

19. The system of claim 18, wherein the exponential scaling function is given by:

$$r_k = \frac{1-a^{-k}}{1-a^{-(n+1)}}$$

wherein k is an index for the score threshold levels and corresponds to an integer$\epsilon(0, n)$, n corresponds to an integer$\geq 1$, $a\epsilon(1, \infty)$, and $r_k$ corresponds to a delivery ratio.

20. The system of claim 16, wherein the N score threshold levels correspond to N delivery ratios according to a power law function.

21. The system of claim 20, wherein the power law function is given by:
$r_k = (k/(n+1))^{(1/s)}$ wherein k is an index for the score threshold levels, n corresponds to an integer$\geq 1$ and $s\epsilon(1, \infty)$.

22. The method of claim 16, wherein the data source comprises a data stream.

23. A system for analyzing documents from a data source, comprising:
a memory; and
a processing system coupled to the memory,
wherein the processing system is configured to:
analyze a reference corpus using a first profile and a second profile to determine reference corpus document scores indicative of content of documents in the reference corpus relative to the first and second profiles;
identify a first reference corpus document score that corresponds to a first delivery ratio of documents of the reference corpus based on the analysis of the reference corpus using the first profile;
identify a second reference corpus document score that corresponds to a second delivery ratio of documents of the reference corpus based on the analysis of the reference corpus using the second profile;
for the first profile, assign first threshold scores to a multiplicity N of score threshold levels such that the first reference corpus document score is assigned to be a threshold score for a given one of the N score threshold levels;
for the second profile, assign second threshold scores to the N score threshold levels such that the second reference corpus document score is assigned to be a threshold score for the given one of the N score threshold levels;
analyze a data source using the first and second profiles and determine first and second raw document scores for documents from the data source relative to the first and second profiles, respectively, based upon the analysis of the data source;
compare the first and second raw document scores generated from the analyses of the data source to the respective first and second threshold scores of the N score threshold levels;

assign first normalized document scores to documents of the data source based on the comparison of the first raw document scores to the first threshold scores of the N score threshold levels as indicators of document relevancy to the first profile;

assign second normalized document scores to the documents of the data source based on the comparison of the second raw document scores to the second threshold scores of the N score threshold levels as indicators of document relevancy to the second profile; and classify a given document of the data source as being relevant to at least one of the first profile and the second profile if at least one of the first normalized document score and the second normalized document score of the given document, respectively, satisfy a relevance threshold.

24. The system of claim 23, wherein the processing system is configured to select the given document for transmission over a communications network.

25. The system of claim 23, wherein the N score threshold levels correspond to N delivery ratios according to an exponential scaling function.

26. The system of claim 25, wherein the exponential scaling function is given by:

$$r_k = \frac{1 - a^{-k}}{1 - a^{-(n+1)}}$$

wherein k is an index for the score threshold levels and corresponds to an integer∈(0, n), n corresponds to an integer≧1, a∈(1, ∞), and $r_k$ corresponds to a delivery ratio.

27. The system of claim 23, wherein the N score threshold levels correspond to N delivery ratios according to a power law function.

28. The system of claim 27, wherein the power law function is given by:
$r_k = (k/(n+1))^{(1/s)}$ wherein k is an index for the score threshold levels, n corresponds to an integer≧1 and s∈(1, ∞).

29. The system of claim 23, the processing system being configured to:

assign a first tag to the given document if the first normalized score satisfies a first relevance threshold and assign a second tag to the given document if the second normalized score satisfies a second relevance threshold; and rank the first and second tags according to relevance to the given document based upon the first normalized score and the second normalized score, the first and second tags being descriptive of content of the first and second profiles, respectively.

30. The system of claim 23, wherein the data source comprises a data stream.

31. An article of manufacture comprising a computer readable medium having embodied therein computer readable program code for analyzing documents, the computer readable program code being adapted to cause a processing system to:

analyze a reference corpus using a profile to determine reference corpus document scores indicative of content of documents in the reference corpus relative to the profile;

identify a particular reference corpus document score that corresponds to a particular delivery ratio of documents of the reference corpus based on the analysis of the reference corpus;

assign threshold scores to a multiplicity N of score threshold levels such that the particular reference corpus document score is assigned to be a threshold score for a given one of the N score threshold levels;

analyze a data source using the profile and determine raw document scores for documents from the data source relative to the profile based upon the analysis of the data source;

compare the raw document scores to the threshold scores of the N score threshold levels;

assign normalized document scores to documents of the data source based on the comparison of the raw document scores to the threshold scores of the N score threshold levels as indicators of document relevancy to the profile; and select a document based upon its normalized document score.

32. The article of claim 31, wherein computer readable program codes is adapted to cause the processing system to assign a tag to the document if the normalized document score of the document satisfies a relevance threshold, the tag being descriptive of content associated with the profile.

33. The article of claim 31, wherein the N score threshold levels correspond to N delivery ratios according to an exponential scaling function.

34. The article of claim 33, wherein the exponential scaling function is given by:

$$r_k = \frac{1 - a^{-k}}{1 - a^{-(n+1)}}$$

wherein k is an index for the score threshold levels and corresponds to an integer∈(0, n), n corresponds to an integer≧1, a∈(1, ∞), and $r_k$ corresponds to a delivery ratio.

35. The article of claim 31, wherein the N score threshold levels correspond to N delivery ratios according to a power law function.

36. The article of claim 35, wherein the power law function is given by:
$r_k = (k/(n+1))^{(1/s)}$ wherein k is an index for the score threshold levels, n corresponds to an integer≧1 and s∈(1, ∞).

37. The method of claim 31, wherein the data source comprises a data stream.

38. An article of manufacture comprising a computer readable medium having embodied therein computer readable program code for analyzing documents, the computer readable program code being adapted to cause a processing system to:

analyze a reference corpus using a first profile and a second profile to determine reference corpus document scores indicative of content of documents in the reference corpus relative to the first and second profiles;

identify a first reference corpus document score that corresponds to a first delivery ratio of documents of the reference corpus based on the analysis of the reference corpus using the first profile;

identify a second reference corpus document score that corresponds to a second delivery ratio of documents of the reference corpus based on the analysis of the reference corpus using the second profile;

for the first profile, assign first threshold scores to a multiplicity N of score threshold levels such that the first reference corpus document score is assigned to be a threshold score for a given one of the N score threshold levels;

for the second profile, assign second threshold scores to the N score threshold levels such that the second reference corpus document score is assigned to be a threshold score for the given one of the N score threshold levels;

analyze a data source using the first and second profiles and determine first and second raw document scores for documents from the data source relative to the first and second profiles, respectively, based upon the analysis of the data source;

compare the first and second raw document scores generated from the analyses of the data source to the respective first and second threshold scores of the N score threshold levels;

assign first normalized document scores to documents of the data source based on the comparison of the first raw document scores to the first threshold scores of the N score threshold levels as indicators of document relevancy to the first profile;

assign second normalized document scores to the documents of the data source based on the comparison of the second raw document scores to the second threshold scores of the N score threshold levels as indicators of document relevancy to the second profile; and classify a given document of the data source as being relevant to at least one of the first profile and the second profile if at least one of the first normalized document score and the second normalized document score of the given document, respectively, satisfy a relevance threshold.

39. The article of claim 38, wherein the computer readable program code is adapted to cause the processing system to select the given document for transmission over a communications network.

40. The article of claim 38, wherein the N score threshold levels correspond to N delivery ratios according to an exponential scaling function.

41. The article of claim 40, wherein the exponential scaling function is given by:

$$r_k = \frac{1 - a^{-k}}{1 - a^{-(n+1)}}$$

wherein k is an index for the score thresholds and corresponds to an integer$\epsilon(0, n)$, n corresponds to an integer$\geq 1$, a$\epsilon(1, \infty)$), and $r_k$ corresponds to a delivery ratio.

42. The article of claim 38, wherein the N score threshold levels correspond to N delivery ratios according to a power law function.

43. The article of claim 42, wherein the power law function is given by:

$r_k = (k/(n+1))^{(1/s)}$ wherein k is an index for the score thresholds, n corresponds to an integer$\geq 1$ and s$\epsilon(1, \infty)$.

44. The article of claim 38, wherein the computer readable program code is adapted to cause the processing system to:

assign a first tag to the given document if the first normalized score satisfies a first relevance threshold and assign a second tag to the given document if the second normalized score satisfies a second relevance threshold; and rank the first and second tags according to relevance to the given document based upon the first normalized score and the second normalized score, the first and second tags being descriptive of content of the first and second profiles, respectively.

45. The article of claim 38, wherein the data source comprises a data stream.

* * * * *